United States Patent
Xu et al.

(10) Patent No.: US 8,225,000 B2
(45) Date of Patent: Jul. 17, 2012

(54) METHOD AND APPARATUS FOR SYNCHRONIZING MESSAGES BETWEEN MULTIPLE TERMINALS

(75) Inventors: Guojun Xu, Shenzhen (CN); Lunjian Mu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 12/341,248

(22) Filed: Dec. 22, 2008

(65) Prior Publication Data

US 2009/0106455 A1    Apr. 23, 2009

Related U.S. Application Data

(63) Continuation-in-part of application No. PCT/CN2007/070976, filed on Oct. 29, 2007.

(30) Foreign Application Priority Data

Dec. 31, 2006 (CN) .......................... 2006 1 0063748

(51) Int. Cl.
    *G06F 15/16* (2006.01)
(52) U.S. Cl. ........ 709/248; 709/203; 709/206; 709/223; 370/503
(58) Field of Classification Search .................. 709/203, 709/223, 248, 206; 370/311, 328, 503; 707/102
    See application file for complete search history.

(56) References Cited

U.S. PATENT DOCUMENTS

| | | | |
|---|---|---|---|
| 5,754,119 A | 5/1998 | Deluca et al. | |
| 7,107,314 B2 * | 9/2006 | Cox | 709/205 |
| 7,386,859 B2 * | 6/2008 | Sandadi et al. | 719/315 |
| 7,756,106 B2 * | 7/2010 | Nakao et al. | 370/352 |
| 7,788,382 B1 * | 8/2010 | Jones et al. | 709/227 |
| 2005/0271004 A1 * | 12/2005 | Cho | 370/328 |
| 2006/0013368 A1 | 1/2006 | LaBaw | |
| 2006/0101064 A1 * | 5/2006 | Strong et al. | 707/102 |
| 2006/0171420 A1 * | 8/2006 | Chu et al. | 370/503 |

FOREIGN PATENT DOCUMENTS

CN    1194755 A    9/1998
(Continued)

OTHER PUBLICATIONS

1st Office Action in corresponding Chinese Application No. 200710167790.2 (Sep. 8, 2010).

(Continued)

*Primary Examiner* — Frantz Jean
(74) *Attorney, Agent, or Firm* — Leydig, Voit & Mayer, Ltd.

(57) ABSTRACT

A method for synchronizing messages between multiple terminals includes: receiving a message state change notification carrying a message state and a message identifier from a first terminal of a user; and sending a message state change notification to the second terminal of the user, according to the message state change notification. A method for synchronizing storage layouts between multiple terminals includes: receiving a storage layout synchronization request carrying a storage directory and/or storage data from a first terminal; sending the storage layout synchronization request to other terminal correlated with the first terminal, so that the other related terminals update the messages or synchronize the media data and/or storage structures. The invention also discloses a server and a terminal for synchronizing messages between multiple terminals. Through the present invention, messages, message states, storage data, and storage structures can be synchronized between multiple terminals.

6 Claims, 8 Drawing Sheets

FOREIGN PATENT DOCUMENTS

| CN | 1543241 A | 11/2004 |
|---|---|---|
| CN | 1770758 A | 5/2006 |
| EP | 1 699 218 A1 | 9/2006 |

OTHER PUBLICATIONS

Written Opinion of the International Searching Authority in corresponding PCT Application No. PCT/CN2007/070976 (Jan. 3, 2008).
"OMA-SyncML-DataSyncProtocol—V1_2-200400601-C—SyncML Data Sync Protocol," Jun. 1, 2004, Candidate Version 1.2, Open Mobile Alliance, San Diego, California.
"OMA-SyncML-DataSyncRep-V1_2-20040601-C—SyncML Representation Protocol, Data Synchronization Usage," Jun. 6, 2004, Candidate Version 1.2, Open Mobile Alliance, San Diego, California.
Crispin, "Internet Message Access Protocol—Version 4rev1," Mar. 2003, The Internet Society, Reston, Virginia.
$2^{nd}$ Office Action in corresponding Chinese Application No. 200710167790.2 (Mar. 29, 2011).
$4^{th}$ Office Action in corresponding Chinese Application No. 200710167790.2 (Nov. 30, 2011).
International Search Report in corresponding PCT Application No. PCT/CN2007/070976 (Jan. 3, 2008).
3rd Office Action in corresponding Chinese Application No. 200710167790.2 (Jul. 29, 2011).

* cited by examiner

METHOD AND APPARATUS FOR SYNCHRONIZING MESSAGES BETWEEN MULTIPLE TERMINALS

CROSS-REFERENCE TO RELATED APPLICATIONS

This application is a continuation-in-part of International Patent Application No. PCT/CN2007/070976, filed Oct. 29, 2007, which claims priority to Chinese Patent Application No. 200610063748.1, filed Dec. 31, 2006, both of which are hereby incorporated by reference in their entirety.

FIELD OF THE INVENTION

The present invention relates to the field of mobile communication technologies, and, in particular, to a method and an apparatus for synchronizing message states or messages between multiple terminals.

BACKGROUND OF THE INVENTION

Messaging services include: Short Message Service (SMS), Multimedia Message Service (MMS), instant message service, and convergent message service etc. The instant message service and the convergent message service are based on the Session Initiation Protocol (SIP) technology and are a kind of presence-based individual-to-individual, individual-to-application, or individual-to-group mobile data service of a message type.

In the existing synchronization technology, data/information is synchronized in a Server/Client mode, so that schedules, address books, short messages, emails, and files may be synchronized.

In the Server/Client mode, a terminal is a device that includes a synchronization client agent, which sends modification to a server and receives a reply from the server. The server can also send a synchronization task request to the terminal. Generally, the terminal is a mobile station, a personal computer (PC), or a Personal Digital Assistant (PDA).

The server is a device that includes a synchronization service agent and a synchronization engine. The terminal sends a synchronization command and modification to the server. After receiving the modification from the terminal, the server replies with the processed synchronization analysis results. Moreover, if no synchronization request command is received and the command can be supported by the transport protocol layer, a synchronization may be initiated from the server to the terminal.

Besides, an email synchronization technology also exists in the prior art. When the email state of a terminal changes, the terminal notifies a server of the change after establishing a connection. The server updates the email state of the mailbox. When the email state of the mailbox of the server changes, the server notifies the terminal of the change (if no connection exists, the server adopts the out-band notification mode through other engines; if a connection exists, the server adopts the in-band notification mode through an IMAP response). After receiving the notification, the terminal updates the local email state accordingly.

However, in the research process, the inventor has discovered that a transmitter or a receiver may have multiple message terminals such as mobile station, PDA, and PC during communication between the transmitter and the receiver. Therefore, when multiple terminals of the transmitter or receiver are powered on, the message sent by the transmitter should be transmitted to the multiple terminals of the receiver simultaneously. Meanwhile, if the transmitter stores a message as a draft in a terminal rather than sending the message out, the transmitter needs to synchronize the unfinished message to other terminals of the transmitter, so that the transmitter may continue editing and sending the message on other terminals. However, the existing synchronization technologies are based on synchronization from a server and a terminal or from a terminal and a server, and the synchronization of messages and message states between multiple terminals of the same user cannot be implemented directly. Therefore, in the conventional technology, the synchronization of messages and message states in the case that the server saves no history messages is unable to be implemented.

SUMMARY OF THE INVENTION

An embodiment of the present invention provides a method and an apparatus for synchronizing messages and storage data layout between multiple terminals, so that messages, message states, storage data, and storage structures may be synchronized between multiple terminals.

A method for synchronizing message states between multiple terminals in an embodiment of the present invention, including: receiving a message state change notification carrying a message state and a message identifier sent from a first terminal; and sending the message state change notification to other terminals correlated with the first terminal.

Another method for synchronizing messages between multiple terminals in an embodiment of the present invention, including: receiving a message update notification carrying update information sent from a first terminal; and sending the message update notification to other terminals correlated with the first terminal.

A method for synchronizing storage layouts between multiple terminals in an embodiment of the present invention, including: receiving a storage layout synchronization request carrying a storage directory and/or storage data information sent from a first terminal; and sending the storage layout synchronization request to other terminals correlated with the first terminal.

A server provided in an embodiment of the present invention includes: a receiving module, adapted to receive a message state change notification and/or a message update notification carrying a message state, a message identifier and/or an updated message sent from a first terminal; and a sending module, adapted to send the message state change notification and/or message update notification to other terminals correlated with the first terminal.

Another server provided in an embodiment of the present invention includes: a receiving module, adapted to receive a storage layout synchronization request carrying a storage directory and/or storage data information sent from a first terminal; and a sending module, adapted to send the storage layout synchronization request to other terminals correlated with the first terminal.

A terminal provided in an embodiment of the present invention includes: a message processing module, adapted to update a message and change the message state; and a sending module, adapted to send a message state change notification and/or a message update notification carrying a message state, a message identifier, and/or an updated message to a server.

Another terminal provided in an embodiment of the present invention includes: an operating module, adapted to operate the storage data and/or storage structure of a local terminal; and a sending module, adapted to send a storage layout synchronization request carrying a storage directory and/or storage data of the local terminal to other terminals correlated with the local terminal after the operating module operates the storage data and/or storage structure of the local terminal.

In the above embodiments under the present invention, when a terminal creates a new message or changes the state of an existing message, a server may synchronize the new message or the latest state of the existing message to other correlated terminals. In this way, the message and the message state are synchronized between multiple terminals. Besides, the notification of generating a new message or changing the state of an existing message from a terminal to a server carries the state and identifier of the new message or the existing message whose state is changed. Even if the server does not save the message, the server may send the message and the message state change notification to other correlated terminals according to the message, message state, and message identifier. As a result, the message and the message state are synchronized between different terminals, and network resources are saved.

DETAILED DESCRIPTION OF THE INVENTION

A method for synchronizing message states between multiple terminals in an embodiment of the present invention includes: receiving a message state change notification carrying a message state and a message identifier sent from a first terminal of a user; and sending the message state change notification to a second terminal of the user, according to the received message state change notification.

A method for synchronizing messages between multiple terminals in another embodiment of the present invention includes: receiving a message update notification carrying the updated message sent from a first terminal of a user; and sending the message update notification to a second terminal of the user, according to the received message update notification.

Embodiment 1

Figure 1:
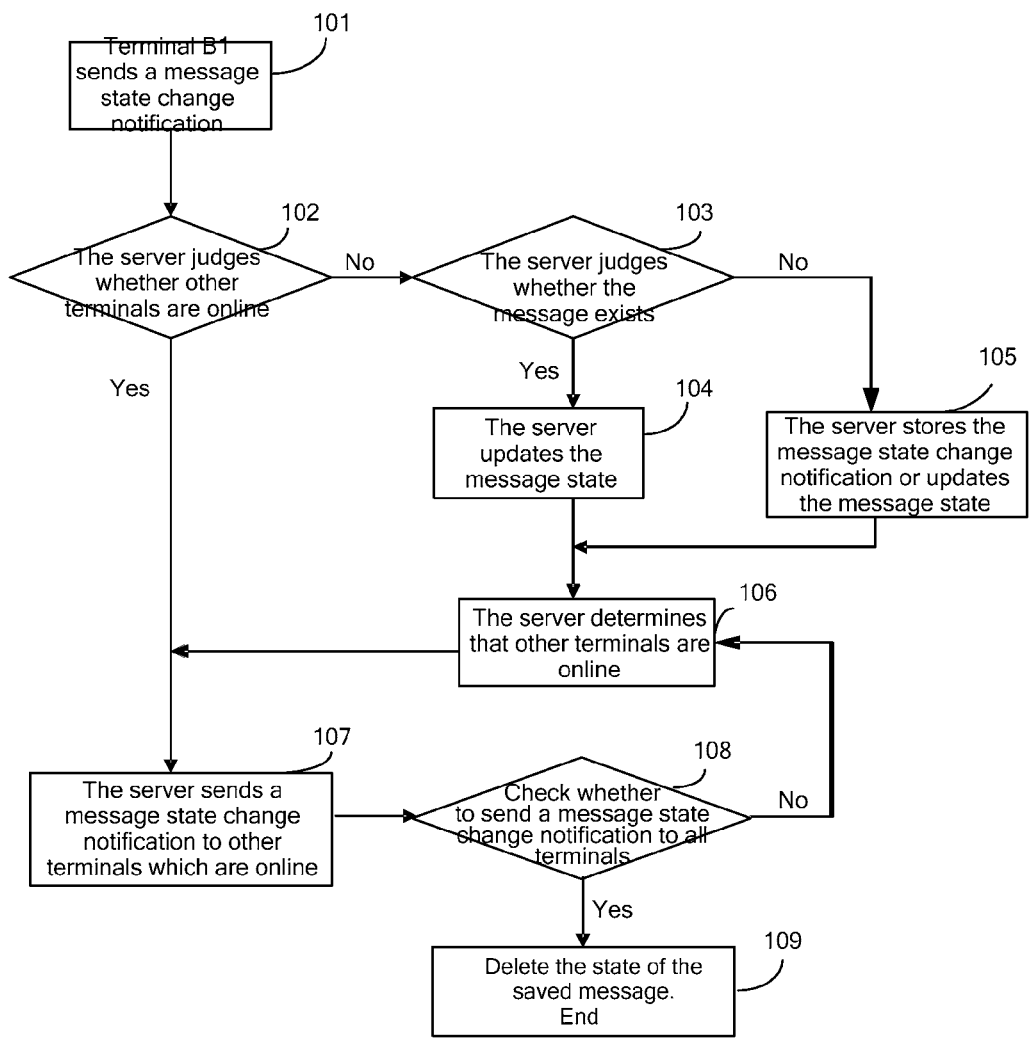
FIG. 1 is a flow chart of a method for synchronizing message states between multiple terminals, according to an embodiment of the present invention.

As shown in FIG. 1, a method for synchronizing message states between multiple terminals is provided according to an embodiment of the present invention, and includes the following blocks.

Block 101: A terminal B1 of a user changes a message state and sends a message state change notification to a server. The message state change notification carries an identifier of the message (e.g. message ID), message state change description (for example, delete, read and modify), a user identifier of the user, and an identifier of the terminal B1. The terminal may use a SIP message or a MSRP, Message Session Relay Protocol, path to send a MSRP SEND message, or use a SIP subscription notification mechanism to send the state change notification through PUBLISH mode. The state change notification may carry multiple messages or message IDs, and each message state change notification may associate the changed states of one or more messages.

Moreover, the terminal that changes the message state may send the message state change notification to the server immediately when the message state is changed, or send the message state change notification to the server after a specific time interval, according to the user setting.

In this block, the terminal may adopt different update modes according to the type of the link between the terminal and the server and the size of the state to be updated. For example, if the content length of the message state change notification is less than 1300 bytes, a first terminal of the user may use SIP PUBLISH, SIP MESSAGE, MSRP SEND, MSRP REPORT, APPEND of the IMAP protocol, or STORE of the IMAP protocol to send the message state change notification; if the content length of the message state change notification is larger than 1300 bytes, the first terminal of the user may use SIP PUBLISH, MSRP SEND, MSRP REPORT, APPEND of the IMAP protocol, or STORE of the IMAP protocol to send the message state change notification.

Block 102: According to the message state change notification and synchronization setting of the user, the server judges whether other terminals that need to be updated are online.

Specifically, the server stores the user identifier of the user and the identifiers of all terminals registered by the user, for example, IP address and mobile number, and correlates the user with all terminals of the user. The user identifier may be represented by Public User Identity; the identifier of any terminal registered by the user may be represented by Private User Identity. For users, each user knows only his/her own identifier. When the user is registered through a specific device, the server records the user identifier and the Private User Identity (for example, IP address, USIM, and MAC address of a terminal) of each terminal of the user, and correlates the Private User Identity of each terminal of the user with the user identifier. In this case, according to the user identifier in the message state change notification, the server obtains the Private User Identity (for example, IP address, USIM, and MAC address of a terminal) of each terminal of the user, and judges whether each terminal of the user is online. If all other terminals of the user that need to be synchronized are online, the process goes to block 107; otherwise, as long as one of the other terminals of the user that need to be synchronized is offline, the server records the terminals identifiers and IP addresses of the online terminals and offline terminal. The server sends a message state change notification to the online terminals, and performs block 103. Besides, the server may combine the user identifier with the identifier of each terminal of the user to represent the terminal identifier. For example, if AA represents a user identifier, the identifiers of the terminals of the user may be represented by AA+IP address, AA+USIM, and AA+MAC address, respectively. In this case, the message state change notification needs to carry the identifiers of all terminals of the user; according to the AA+IP address, AA+USIM, and AA+MAC address, the server judges whether other terminals that need to be synchronized are online. If all other terminals of the user that need to be synchronized are online, the process goes to 107; otherwise, as long as one of other terminals of the user that need to be synchronized is offline, the server records the terminal identifiers and IP addresses of the online terminals and the offline terminal. The server sends a message state change notification to the online terminals, and performs block 103.

Block 103: According to the message state change notification, specifically, message ID in the notification, the server judges whether a message associating the message ID exists in the server. If no message associating the message ID exists in the server, the process goes to block 104; if the message associating the message ID exists in the server, the process goes to block 105.

Block 104: The server updates the state of the message according to the message state change notification and saves the state of the message.

In this block, the server may adopt different update modes, according to the type of the link between the server and other terminals and the size of the message to be updated. If the byte of the message to be synchronized is less than 1300 bytes, the server may send a synchronization notification through a SIP message; if the byte of the message to be synchronized is larger than 1300 bytes, the synchronization notification cannot be sent through a SIP message. If a MSRP link already exists between the terminal and the server, the terminal may send a MSRP REPORT/SEND to the server to update the message.

Block 105: The server stores the message state change notification, or updates the state of the message associating the message ID and saves the state.

Block 106: According to the terminal identifiers and IP addresses of the stored offline terminals, the server determines that the other terminals of the user are online.

Block 107: According to the received message state change notification or the message state stored in the server, the server sends a message state change notification to other online terminals, and records the terminal identifiers (for example, IP addresses) of the terminals which the message state change notification has been sent; or, the server records the terminal identifiers (for example, IP addresses of the terminals) of the offline terminals, and after the terminals, which are recorded as offline previously, go online, and the server sends a message state change notification to the recorded terminals which go online, and then deletes the identifiers of the recorded terminals to which the message state change notification has been sent.

Block 108: The server judges whether the message state change notification has been sent to all the terminals of the user that need to be synchronized. According to the recorded identifiers of the terminals to which the message state change notification has been sent, the server compares them with the identifiers of the terminals which are correlated with the user identifier, stored in the server and obtained by the server in block 102; or, according to the recorded identifiers of the offline terminals, the server judges whether the message state change notification has been sent to all the terminals of the user that need to be synchronized. If so, the process goes to block 109; otherwise, the process goes to block 106.

Block 109: The server deletes the stored message state. The process ends.

Embodiment 2

Figure 2:
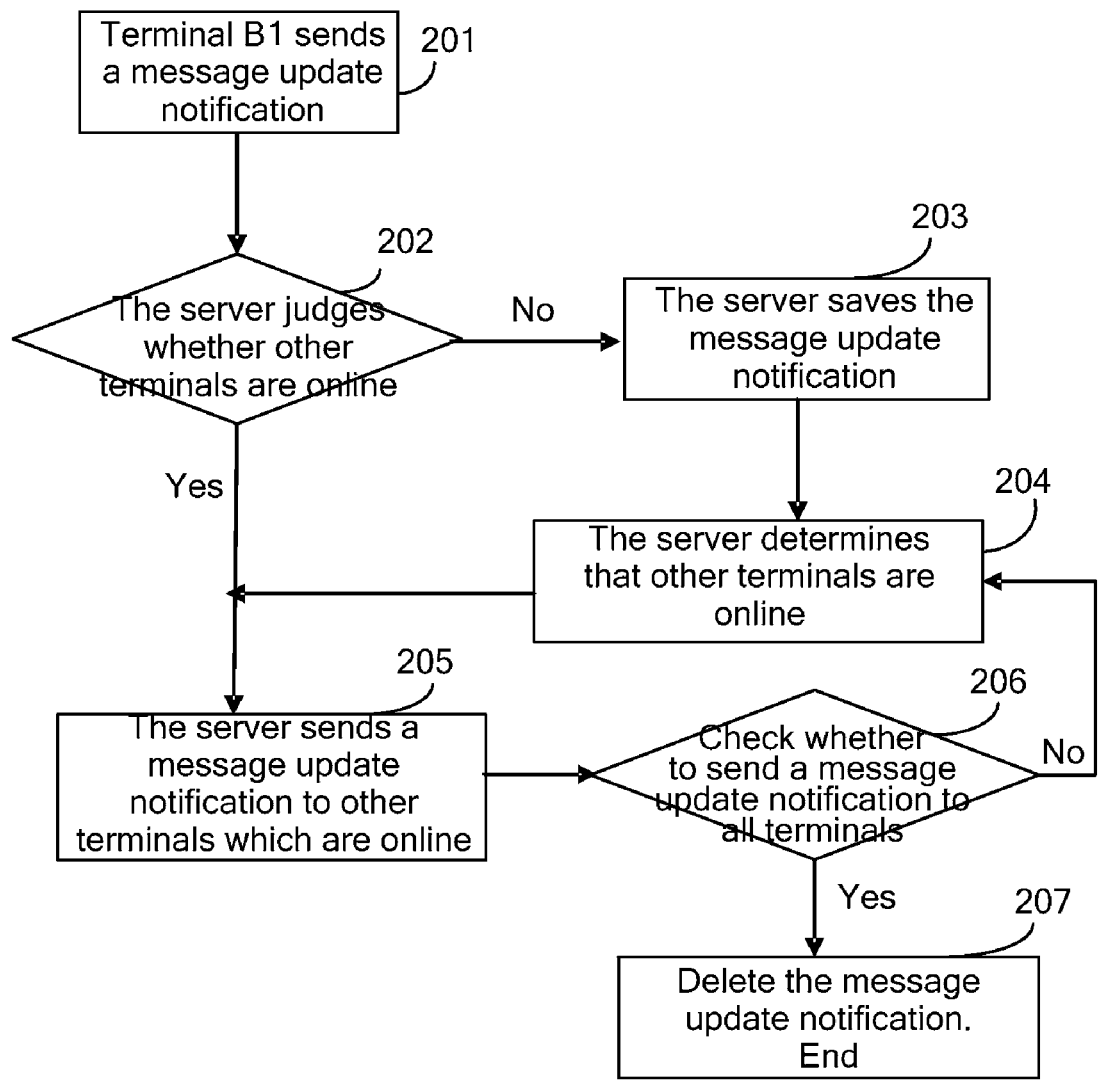
FIG. 2 is a flow chart of a method for synchronizing messages between multiple terminals, according to another embodiment of the present invention.

FIG. 2 shows a method for synchronizing messages between multiple terminals according to another embodiment of the present invention. Compared with the method for synchronizing the message state between multiple terminals, as shown in FIG. 1, the message for synchronizing a message between multiple terminals is different by the following: the server needs to save the message update notification which carries the message, without the need to construct a new message according to the received message update notification or save the new message. The detailed process is as follows.

Block 201: A terminal B1 of a user creates a new message and sends a message update notification to the server. The message update notification carries the new message. The terminal may use a SIP message or a MSRP path to send an MSRP SEND message, or use the SIP subscription notification mechanism to send the message update notification through PUBLISH mode. The message update notification may carry multiple new messages created by the terminal B1 of the user and IDs of the new messages.

Further, the terminal B1 may send the message update notification to the server immediately after creating a new message, or send the message update notification to the server after a specific time interval, depending on the user setting.

In this block 201, the terminal B1 may adopt different update modes according to the type of the link between the terminal and the server and the size of the message to be updated. If the byte of the message to be synchronized is less than 1300 bytes, the terminal B1 may send a synchronization update notification through a SIP PUBLISH, SIP MESSAGE, MSRP SEND, or MSRP REPORT message; otherwise, if the byte of the message to be synchronized is larger than 1300 bytes, the notification cannot be sent through a SIP message. If a MSRP link already exists between the terminal B1 and the server, the terminal B1 may send a MSRP REPORT/SEND to the server to synchronize the new message.

Block 202: According to the message update notification and the synchronization setting of the user, the server judges whether other terminals that need to be synchronized are online. The synchronization setting of the user may be: setting identifiers of multiple terminals of the user that need to be synchronized.

The server stores a user identifier of the user and the identifiers of all terminals registered by the user, and correlates the user with all terminals of the user. In this block 202, according to the user identifier in the message update notification, the server obtains the identifier of the terminal correlated with the user identifier stored in the server; according to the setting of the terminal to be synchronized, the server judges whether other terminals that need to be synchronized and are associated with the user are online. If all other terminals of the user that need to be synchronized are online, the process goes to block 205; otherwise, as long as any one of the other terminals of the user that need to be synchronized is offline, the server records the identifiers of the online terminals and the offline terminal. The server sends the message update notification to the online terminals and performs block 203.

Block 203: The server saves the message update notification.

In this block 203, the server may adopt different update modes, according to the type of the link between the server and the other terminals and the size of the message to be updated. If the byte of the message to be synchronized is less than 1300 bytes, the server may send a synchronization notification through a SIP message; if the byte of the message to be synchronized is larger than 1300 bytes, the notification cannot be sent through a SIP message. If a MSRP link already exists between the terminal and the server, the terminal may send a MSRP REPORT/SEND to the server to update the message.

Block 204: According to the identifiers of the recorded offline terminals, the server determine that the other terminals of the user are online, and then performs block 205.

Block 205: The server sends a message update notification to the other terminals which are online. In this block 205, the message update notification may be a message update notification sent by the terminal B1 to the server, or a message update notification stored in the server.

Block 206: The server judges whether the message update notification has been sent to all the other terminals of the user that need to be synchronized. In this block 206, according to the recorded identifiers of the terminals to which the message update notification has been sent, the server compares them with the identifiers of the terminals which are correlated with the user identifier, stored in the server and obtained by the server in block 202; or, according to the recorded identifiers of the offline terminals, the server judges whether the message state change notification has been sent to all the terminals of the user that need to be synchronized. If so, the process goes to block 207; otherwise, it goes to block 204.

Block 207: The server deletes the message update notification. The process ends.

Embodiment 3

Figure 3:
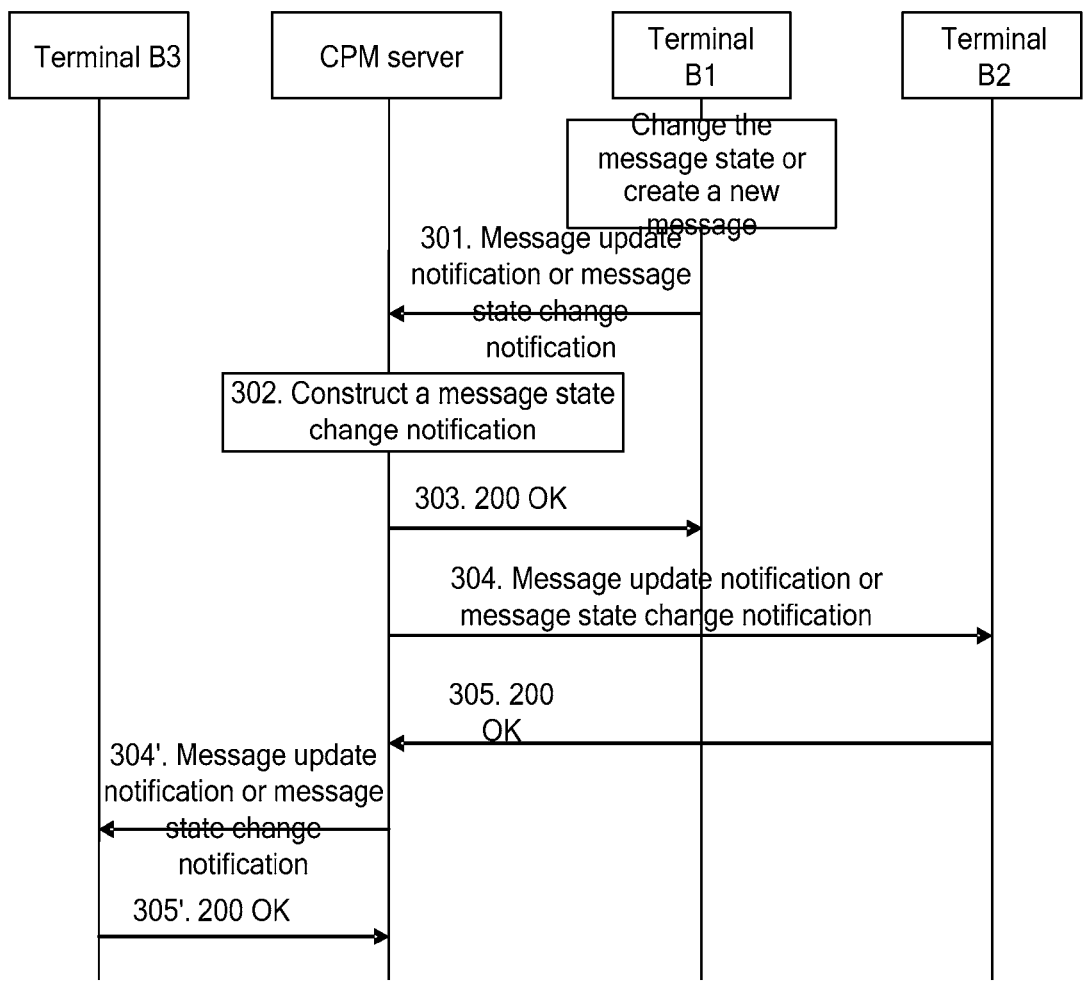
FIG. 3 is a flow chart of synchronizing message states between a server and multiple terminals through a SIP message format, according another embodiment of the present invention.

FIG. 3 is a flow chart of synchronizing messages or message states between a server and multiple terminals through a SIP message format in another embodiment of the present invention, supposing that all terminals (B1, B2, and B3) of a user are online. Terminals B1, B2, and B3 represent multiple terminals of user B for receiving messages in a message system, which may be a SIP-based Instant Message and Presence Leveraging Extensions (SIMPLE) system, an Instant Message (IM) system, or a Converged IP Messaging (CPM) system. The home server of the terminals may be an IM or CPM server. The messaging server here may be a CPM server, and the CPM server may serve as a participant function server or an offline messaging server. The detailed process is as follows.

Block 301: When the terminal B1 of the user B creates a new message or changes the state of a message, for example, the terminal B1 creates a new message which amount of data is less than 1300 bytes, reads an existing message, or deletes a message, the terminal B1 creates a SIP message and sends the SIP message to the CPM server, i.e. the terminal B sends to the CPM server a message update notification or a message state change notification. The message update notification carries the new message created by terminal B1. The message state change notification carries: Content-Type: message/imdn+xml, which indicates the message content type is a reading report encapsulated through a message/CPIM of the content type; Content-Disposition: notification; and XML content. The content carried in the message state change notification represents the state update information which at least includes the message ID, form and time of state update, or indicates the corresponding message and the file directory where the message is located.

Block 302: The CPM server parses the message state update notification received and constructs a message-state changing message associating the message ID in the message state change notification. If it is a message update notification that is received by the server, this block 302 may be skipped. This block 302 is optional, and the server does not necessarily construct a new message-state changing message.

Block 303: The CPM server returns a 200 OK response to the terminal B1. Block 303 may occur before or after block 302.

Block 304: The CMP server determines that the terminal B2 is online and sends the constructed message-state changing message to the terminal B2, or the CMP server sends the message update notification received to the terminal B2.

Block 305: The terminal B2 updates the message state and returns a 200 OK response to the CPM server, or the terminal B2 saves the new message carried in the message update notification.

Block 304': The CMP server determines that the terminal B3 is online and sends the message-state changing message to the terminal B3, or the CMP server sends the received message update notification to B3.

Block 305': The terminal B3 updates the message state and returns a 200 OK response to the CPM server, or the terminal B3 saves the new message carried in the message update notification.

Embodiment 4

Figure 4:
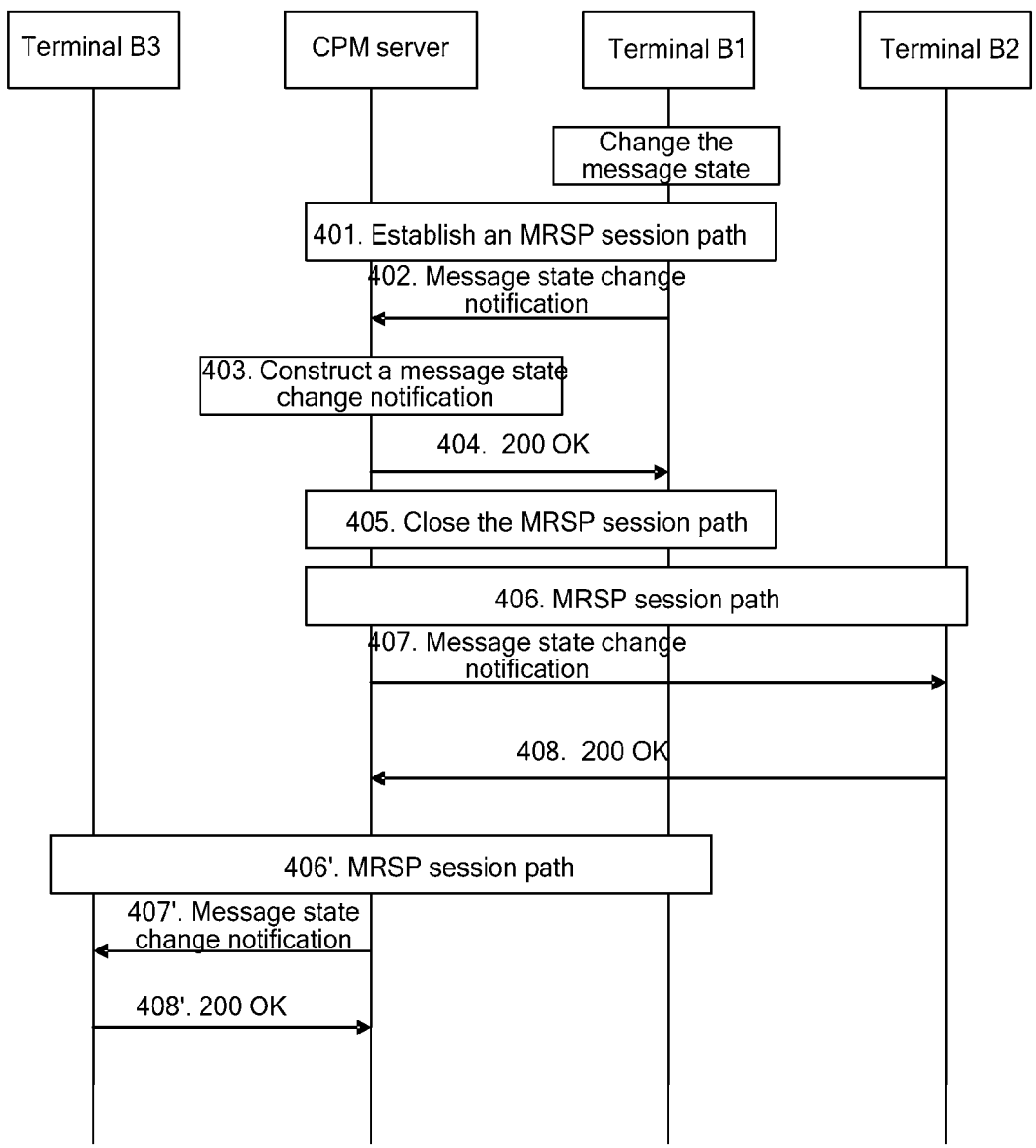
FIG. 4 is a flow chart of synchronizing message states between a server and multiple terminals over MSRP, according to another embodiment of the present invention.

FIG. 4 is a flow chart of synchronizing message states between a server and multiple terminals over MSRP in another embodiment of the present invention, supposing that all terminals B1, B2, and B3 of a user are online. Terminals B1, B2, and B3 represent multiple terminals of user B for receiving messages in a message system, which may be a SIMPLE system, an IM system, or a CPM system. The CPM server is a messaging server where user B is registered. Therefore, the CPM server may serve as a participant function server or an offline messaging server.

Block 401: Suppose that the terminal B1 of the user B updates the state of a message, for example, the terminal B1 reads a new message or deletes a message. According to the preference and setting of user B, the message state needs to be updated between the server and other terminals. Then, the terminal B1 generates a SIP INVITE message to notify the CPM server and establishes a MSRP session path with the CPM server.

Block 402: The terminal B1 sends a message state change notification to the CPM server B through MSRP SEND or MSRP REPORT mode. The message state change notification carries: Content-Type: message/imdn+xml, which indicates the message content type is a reading report encapsulated through a message/CPIM of the content type; Content-Disposition: notification; and XML content. The content carried in the message state change notification represents the state update information which at least includes the message ID, form and time of state update, or indicates the corresponding message and the file directory where the message is located.

Block 403: The CPM server parses the message state update notification, and constructs a message-state changing message associating the message ID in the message state change notification. This block 403 is optional, and the server does not necessarily construct a new message-state changing message.

Block 404: The CPM server returns a 200 OK response to the terminal B1. Block 404 may occur before or after block 403.

Block 405: The CPM server disconnects the MSRP session path between the CPM server and terminal B1 by sending a message, such as SIP BYE message, to the terminal B1.

Block 406: The CPM server establishes a MSRP session path between the CPM server and terminals B1 and B2 by sending a message, such as SIP INVITE message, to terminal B2.

Block 407: The CPM server determines that terminal B2 is online and sends the constructed message-state changing message to terminal B2 through MSRP SEND or MSRP REPORT.

Block 408: Terminal B2 updates the message state and returns a 200 OK response to the CPM server.

Block 406': The CPM server establishes a MSRP session path between the CPM server and terminals B1 and B3 by sending a message, such as SIP INVITE message, to terminal B3.

Block 407': The CPM server determines that terminal B3 is online and sends the constructed message-state changing message to terminal B3 through MSRP SEND or MSRP REPORT.

Block 408': Terminal B3 updates the state of the message and returns a 200 OK response to the CPM server.

The MSRP protocol may also be used between a server and multiple terminals to synchronize messages between multiple terminals. The detailed implementation is similar to FIG. 4 and its embodiment, and is not described in detail here.

Besides, the MSRP protocol may be used for synchronizing messages or message states between multiple terminals directly in an embodiment of the present invention. Suppose that all terminals B1, B2 and B3 of a user are online. In this case, the CPM server where user B is registered only transits signaling messages. After receiving a message update notification or a message state change notification sent from the terminal B1 of the user B and receiving a link creation request, the CPM server forwards the received message update notification or message state change notification to the other terminals B2 and B3 of the user, so that a MSRP session path is established between B1 and B2, and between B1 and B3. Through the established MSRP session path, the message and message state are synchronized between any two of the terminals B1, B2, and B3. The method for sending a message and the message state notification, the method for establishing a MSRP session path, and the method for synchronizing a message and the message state in this embodiment are similar to those illustrated in FIG. 3, and are not detailed here.

Embodiment 5

Figure 5:
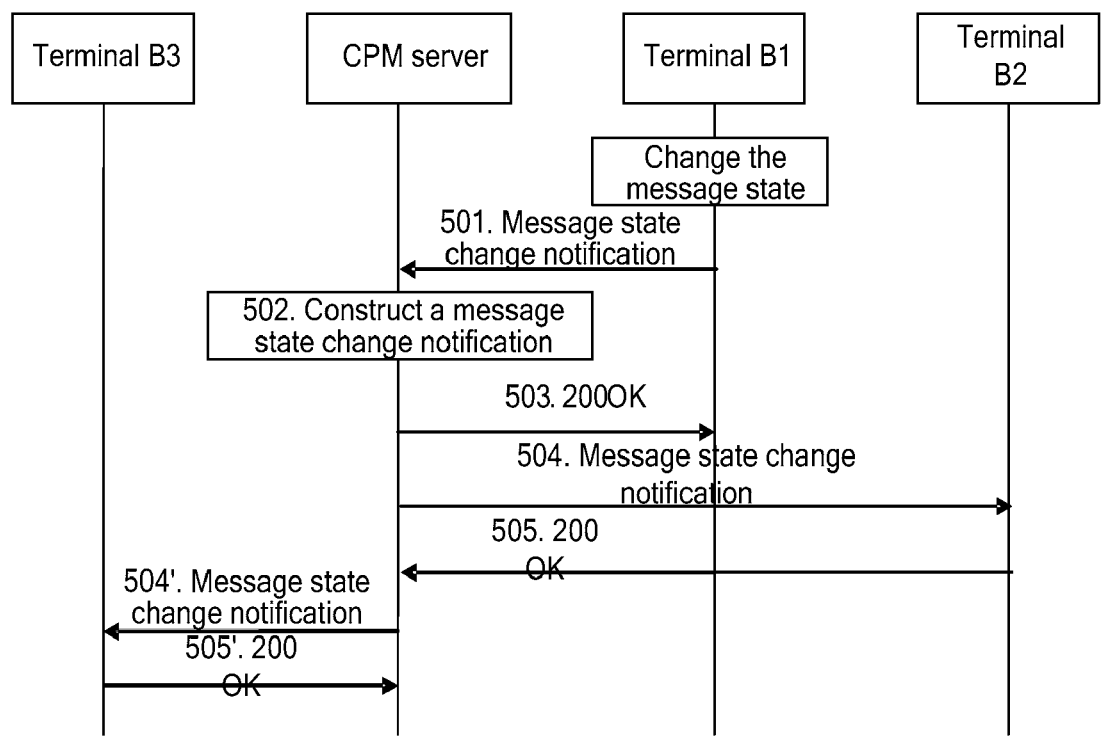
FIG. 5 is a flow chart of synchronizing message states between multiple terminals through SUBSCRIBE and NOTIFY messages, according to another embodiment of the present invention.

FIG. 5 is a flow chart of synchronizing message states between multiple terminals through SIP SUBSCRIBE and SIP NOTIFY in an embodiment of the present invention. Depending on the user setting, all terminals (B1, B2, and B3) of a user B subscribes to message state update notifications from the server in this embodiment. Moreover, this embodiment supposes that all terminals (B1, B2, and B3) of the user are online. Terminals B1, B2, and B3 represent multiple terminals of user B for receiving messages in a message system, which may be a SIMPLE system, an IM system, or a CPM system. The CPM server is a messaging server where user B is registered. Therefore, the CPM server may serve as a participant function server or an offline messaging server.

Block 501: Suppose that the terminal B1 of the user B updates the state of a message, for example, reads a new message, or deletes a message. According to the preference and setting of the user B, the message state needs to be updated between the terminal B1 and other terminals. Terminal B1 sends a message state change notification to the server through SIP PUBLISH. The message state change notification carries:

Content-Type: message/imdn+xml, which indicates the message content type is a reading report encapsulated through a message/CPIM of the content type; Content-Disposition: notification; and XML content. The content carried in the message state change notification represents the state update information which at least includes the message ID, form and time of state update, or indicates the overview of the received message.

Block 502: The CPM server parses the message state update notification and constructs a message-state changing message associating the message ID in the message state change notification. This block 502 is optional, and the server does not necessarily construct a new message of changing the message state.

Block 503: The CPM server returns a 200 OK response to the terminal B1. Block 503 may occur before or after block 502.

Block 504: After determining that the terminal B2 is online and the terminal B2 has subscribed to the message state change notification, the CPM server sends the constructed message of changing the message state to the terminal B2 through NOTIFY, SIP MESSAGE, or SIP PUBLISH.

Block 505: The terminal B2 updates the state of the message and returns a 200 OK response to the CPM server.

Block 504': The CPM server B determines that the terminal B3 is online and the terminal B3 has subscribed to the message state change notification, so the CPM server sends the constructed message of changing the message state to the terminal B3 through NOTIFY, SIP MESSAGE or SIP PUBLISH.

Block 505': Terminal B3 updates the state of the message and returns a 200 OK response to the CPM server.

A SUBSCRIBE or NOTIFY message may also be used between a server and multiple terminals to synchronize messages between multiple terminals. The detailed implementation is similar to FIG. 5 and its embodiment, and is not described in detail here.

The foregoing embodiments synchronize the message or the message state, supposing that all terminals B1, B2, and B3 of user B are online. If some terminals (for example, B2 and B3) are offline, the message or message state may be synchronized in one of the following ways.

I. The CPM server saves the offline messages sent to an offline terminal, such as B2, in the offline period, and records the message state which changes in the offline period or saves the message update notification received in the offline period. When terminal B2 goes online, the CPM server synchronizes the messages and state changes which occur in the offline period to terminal B2. The method for synchronizing messages and message states is similar to the online synchronization method described above.

II. The CPM server saves all kinds of messages and the message states. When terminal B2 goes online, the CPM server synchronizes the messages and the message states stored while the terminal B2 is offline. The method for synchronizing messages and message states is similar to the online synchronization method described above.

III. A terminal which goes online, such as terminal B2, sends a synchronization request to other terminals which are online, such as terminal B1 and B3, and establishes a transmission path between them through a server to synchronize the messages and message states which change during the offline period of terminal B2.

IV. The terminal which goes online, such as terminal B2, sends a request for synchronizing messages and states to the CPM server. The CPM server sends a synchronization request to other terminals such as terminal B1 and B3 which are online. The CPM server synchronizes other online terminals (terminal B1 or B3), and then establishes a transmission path with terminal B2 to synchronize the messages and states which change during the offline period of terminal B2.

Moreover, in the foregoing cases, if the user B changes the message state through terminal B1 while terminal B2 is offline and the user B also changes the message state on terminal B3 before B2 goes online, changing the message state is an interaction process. The terminal B2 that receives the message changes checks the time when the state of the message is changed and applies the latest state.

Moreover, the present invention provides a method for synchronizing storage layouts between multiple terminals. Synchronization of storage layout refers to synchronization of storage paths and storage directory names on different terminals as against the root directory of the local storage device, and synchronization of the data items, such as messages, images, audios, and videos stored in different directories on different terminals, together with the storage path information.

Embodiment 6

Figure 6:
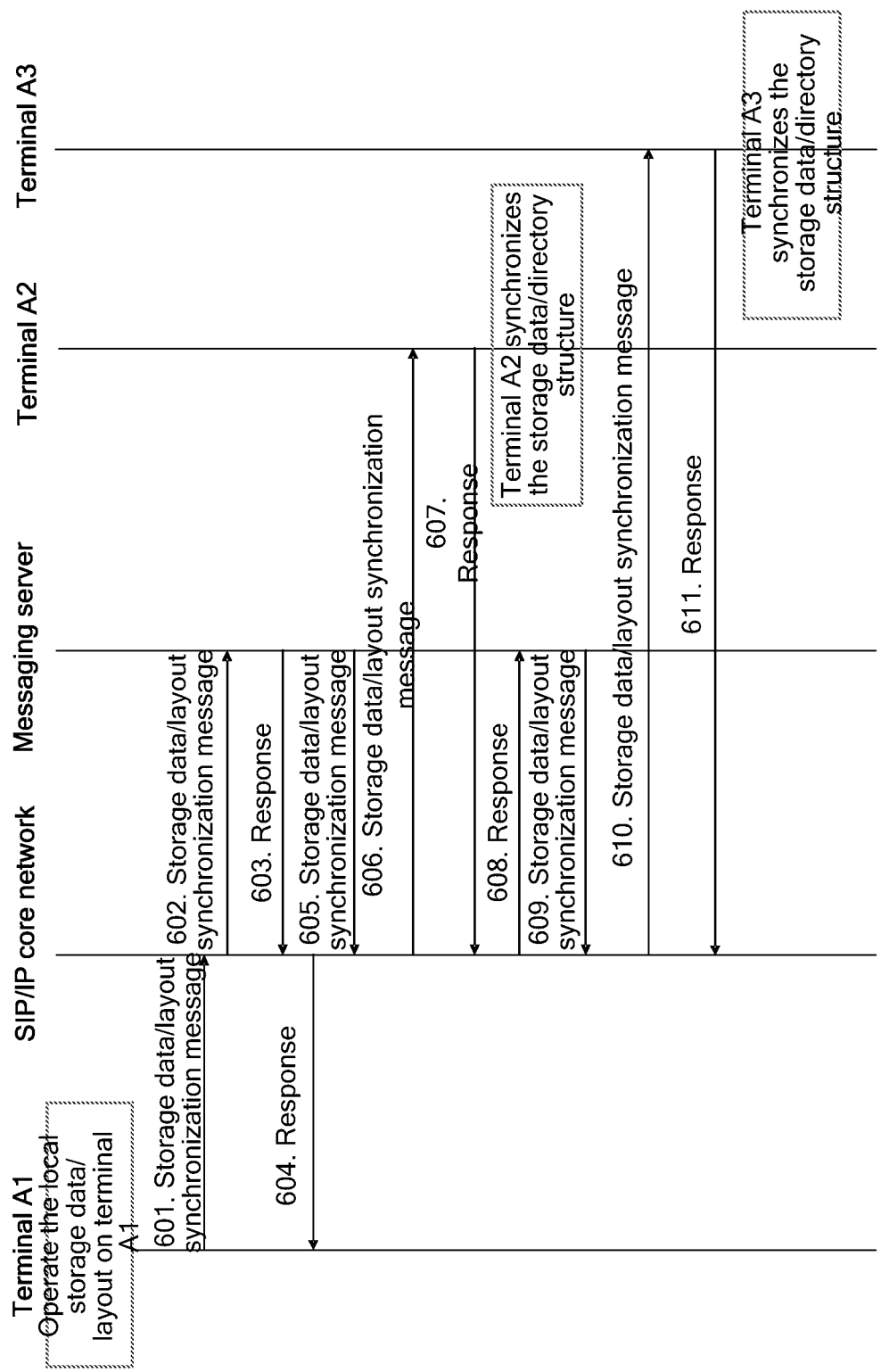
FIG. 6 is a flow chart of the method for synchronizing storage layout between multiple terminals, according to another embodiment of the present invention.

FIG. 6 is a flow chart of a method for synchronizing data operations and/or storage layouts between multiple terminals in an embodiment of the present invention. In FIG. 6, terminals A1, A2, and A3 represent the terminals of a user A, SIP/IP core network is a core network for routing SIP signaling, and a messaging server is a messaging service server where the user A is registered. The method includes: after new data is stored and/or storage layout is updated in a terminal (such as A1) of user A, sending a synchronization message carrying storage data and/or storage layout information to other relevant terminals such as terminal A2 and terminal A3, in order to make the relevant terminals A2 and A3 update the storage data and/or storage directory.

In the case that only the storage layout is changed in A1, the process of synchronizing storage layout is as follows.

Blocks 601-604: The terminal A1 of the user A performs operations (for example, creates, deletes or renames) for a local storage directory. In order to synchronize the storage directory operation on other terminals of the user A, the terminal A1 sends a storage directory synchronization message to a home messaging server and defines a new Content-Type header field "message/hierarchy-synchronization" and a Content-Disposition header field "synchronization," instructing the message receiver to synchronize the storage layout, according to the received message body. In this embodiment, the storage layout synchronization description may be given in the XML format: the value of the synchronization element <synchronization> identifier "id" and the synchronization type "type" are "folder," which includes: storage layout path <folder-hierarchy> and the corresponding storage directory name. The values of <action> indicative of the operation of synchronizing the storage directory include: "create," "delete," and "rename." After receiving the synchronization message, the messaging server returns a response to terminal A1.

Blocks 605-612: The messaging server forwards the storage directory synchronization message to other terminals (A2 and A3) according to the terminal record about login of user A. After receiving the storage directory synchronization message, the terminal A2 and A3 read the synchronization description information carried in the storage directory synchronization message and synchronize the storage directory in their local storage devices, as detailed below.

(1) If the local storage devices of the terminal A2 and A3 do not have the storage layout specified in the storage directory synchronization message and the corresponding synchronization operation is "create," the terminal A2 and A3 create a specified storage directory according to the synchronization description, including the storage directory in the synchronization path; otherwise, terminal A2 and A3 do not perform any operation.

(2) If the local storage devices of terminal A2 and A3 do not have the storage directory specified in the storage directory synchronization message and the corresponding synchronization operation is "rename," terminal A2 and A3 create a specified storage directory according to the new storage directory name in synchronization description, including the storage directory in the synchronization path; otherwise, terminal A2 and A3 do not perform any operation.

(3) If the local storage devices of terminal A2 and A3 do not have the storage directory specified in the storage directory synchronization message and the corresponding synchronization operation is "delete," terminal A2 and A3 delete the specified storage directory according to the synchronization description, but not including the storage directory in the synchronization path; otherwise, terminal A2 and A3 do not perform any operation.

In the above embodiment, the storage directory is a specific example of the storage layout. In the case that only storage data items in the storage layout is stored in A1, the process of synchronizing storage layout is as follows.

A user A stores data items in a storage directory of the local storage device of terminal A1, including: storing, updating, and deleting messages and media files.

In order to synchronize the corresponding storage content in the corresponding storage directory of other terminals of user A, terminal A1 sends a storage data items synchronize message in the storage layout to the messaging server where terminal A1 is registered. Like the synchronization message sent for operating the storage layout structure mentioned above, the synchronization message body may give a storage layout synchronization description in the XML format: the value of the synchronization element <synchronization> identifier "id" and synchronization type "type" are "file," including: the path of the storage layout containing the storage data item—<folder-hierarchy>, the corresponding storage data item name, and synchronization operation performed for the storage data item—<action>, whose values include: "store," "update," and "delete." Besides, the synchronization message body also includes the storage data item itself, for example, instant message and multimedia image. The messaging server returns a receiving response to A1 and forwards the synchronization message to other terminals A2 and A3 of user A. According to the storage layout description and the corresponding data items in the received synchronization message, terminals A2 and A3 perform the same operation on their own local storage devices, as detailed below.

(a) If the local storage devices of the terminals A2 and A3 do not have the directory structure that contains the storage data items specified in the synchronization message, the terminals A2 and A3 create a specified directory, according to the synchronization description of the synchronization message, including the directory of the synchronization path.

(b) If the storage data items to be operated do not exist in the storage directories of the terminals A2 and A3 as specified in the synchronization message and the synchronization operation carried in the synchronization message is "save," the terminals A2 and A3 save the storage data items carried in the synchronization message into the specified storage directory; if the storage data items to be operated in the synchronization message already exist in the corresponding storage directories of the local storage devices of the terminals A2 and A3, the terminals A2 and A3 do not perform any operation.

(c) If the storage data items to be operated do not exist in the storage directory of the terminals A2 and A3 as specified in the synchronization message and the synchronization operation carried in the synchronization message is "update," the terminals A2 and A3 save the storage data items carried in the synchronization message into the specified storage directory; if the storage data items to be operated in the synchronization message already exist in the corresponding storage directories of the local storage devices of terminals A2 and A3, the terminals A2 and A3 use the storage data items carried in the synchronization message to overwrite the existing data items in the storage directory.

(d) If the storage data items to be operated do not exist in the storage directories of the terminals A2 and A3 as specified in the synchronization message and the synchronization operation carried in the synchronization message is "delete," the terminals A2 and A3 does not perform any operation; if the storage data items to be operated in the synchronization message already exist in the corresponding storage directories of the local storage devices of the terminals A2 and A3, the terminals A2 and A3 delete the storage data items in the storage directory.

Besides, the user may copy or move the storage data items stored in the local storage device of terminal A1 to another storage directory.

In order to synchronize storage data items in the corresponding storage directory of other terminals of the user A, the terminal A1 sends a message of copying or moving storage data items in the storage layout to the messaging server where terminal A1 is registered. Like the aforementioned synchronization message, the synchronization message body may give a storage layout synchronization description in the XML format: the value of the synchronization element <synchronization> identifier "id" and synchronization type "type" are "file," including: the path of the source storage layout containing the storage data item—<folder-hierarchy>, the corresponding storage directory name, and synchronization operation performed for the storage data item—<action>, whose values include: "copy," and "move."

The messaging server returns a receiving response to A1 and forwards the synchronization message to other terminals A2 and A3 of the user A. According to the storage data items and the destination storage directory specified in the received synchronization message, the terminals A2 and A3 perform the same operation on their own local storage devices, as detailed below.

(a) If the local storage devices of the terminals A2 and A3 do not have the directory specified in the synchronization message, namely, the source storage directory and the destination storage directory containing the storage data items, terminals A2 and A3 create a specified directory, according to the synchronization description in the synchronization message, including the directory in the synchronization path.

(b) If the storage data items to be operated do not exist in the source storage directory of terminals A2 and A3 as specified in the synchronization message and the synchronization operation carried in the synchronization message is "copy," terminals A2 and A3 save the storage data items carried in the synchronization message into the source storage directory, and then save the storage data items into the destination storage directory; if the storage data items to be operated in the synchronization message already exist in the source storage directories of the local storage devices of terminals A2 and A3, terminals A2 and A3 need only to save the storage data items carried in the synchronization message into the destination storage directory. If the storage data items already exist in the destination directory, the existing storage data items are overwritten by the storage data items carried in the synchronization message.

(c) If the storage data items to be operated do not exist in the source storage directory of terminals A2 and A3 as specified in the synchronization message and the synchronization operation carried in the synchronization message is "move," terminals A2 and A3 need only to save the storage data items carried in the synchronization message into the destination storage directory; if the storage data items to be operated in the synchronization message already exist in the source storage directory of the local storage devices of terminals A2 and A3, terminals A2 and A3 need to delete the storage data items in the source storage directory, and then save the storage data items carried in the synchronization message into the destination storage directory. If the storage data items already exist in the destination directory, the existing storage data items are overwritten by the storage data items carried in the synchronization message.

(d) If terminal A2 or A3 is offline when the messaging server receives the synchronization message, the operation is different from the above block only in that: the messaging server saves the synchronization message as an offline message and sends it after A2 or A3 goes online.

In this embodiment, in addition to the process of sending the synchronization message shown in FIG. 6, in order to synchronize the storage layout between multiple terminals, terminal A1 may send the synchronization message to terminals A2 and A3 directly, after user A operates the storage directory or storage data items stored locally on terminal A1. That is to say, the synchronization message sent by terminal A1 to the messaging server A carries the address or identifier of terminal A2 or A3. After receiving the synchronization message, the messaging server A sends the synchronization message to terminal A2 or A3 directly, according to the address or identifier of terminal A2 and/or A3 carried in the synchronization message. In this embodiment, the messaging server A does not need to search for the terminals registered by the user.

Similarly, if the operation of storing data and the operation of updating the storage layout structure are performed on A1 concurrently, the process of processing the synchronization message is similar to the foregoing process basically, and is not repeated here any further.

The aforementioned process of synchronizing the storage layout and/or storage data between multiple terminals requires the terminal that receives a synchronization request to perform strict synchronization operation in the local storage device, according to the synchronization information carried in the synchronization request. In the practical application, the user may select different synchronization policies, according to the storage requirements of different terminals, namely, strict synchronization is maintained between some terminals, and other terminals may reject the synchronization operation even if receiving a synchronization request; or strict synchronization is maintained between some the terminals, and specific storage layout or storage data in the terminals are not affected by the synchronization operation. The operation of limited synchronization or partial synchronization may be implemented at the terminal as instructed by the user. In this case, the terminal needs to perform the synchronization of storage layout and/or storage data in light of the synchronization information in the received synchronization request and the local storage policies of the terminal.

Embodiment 7

Figure 7:
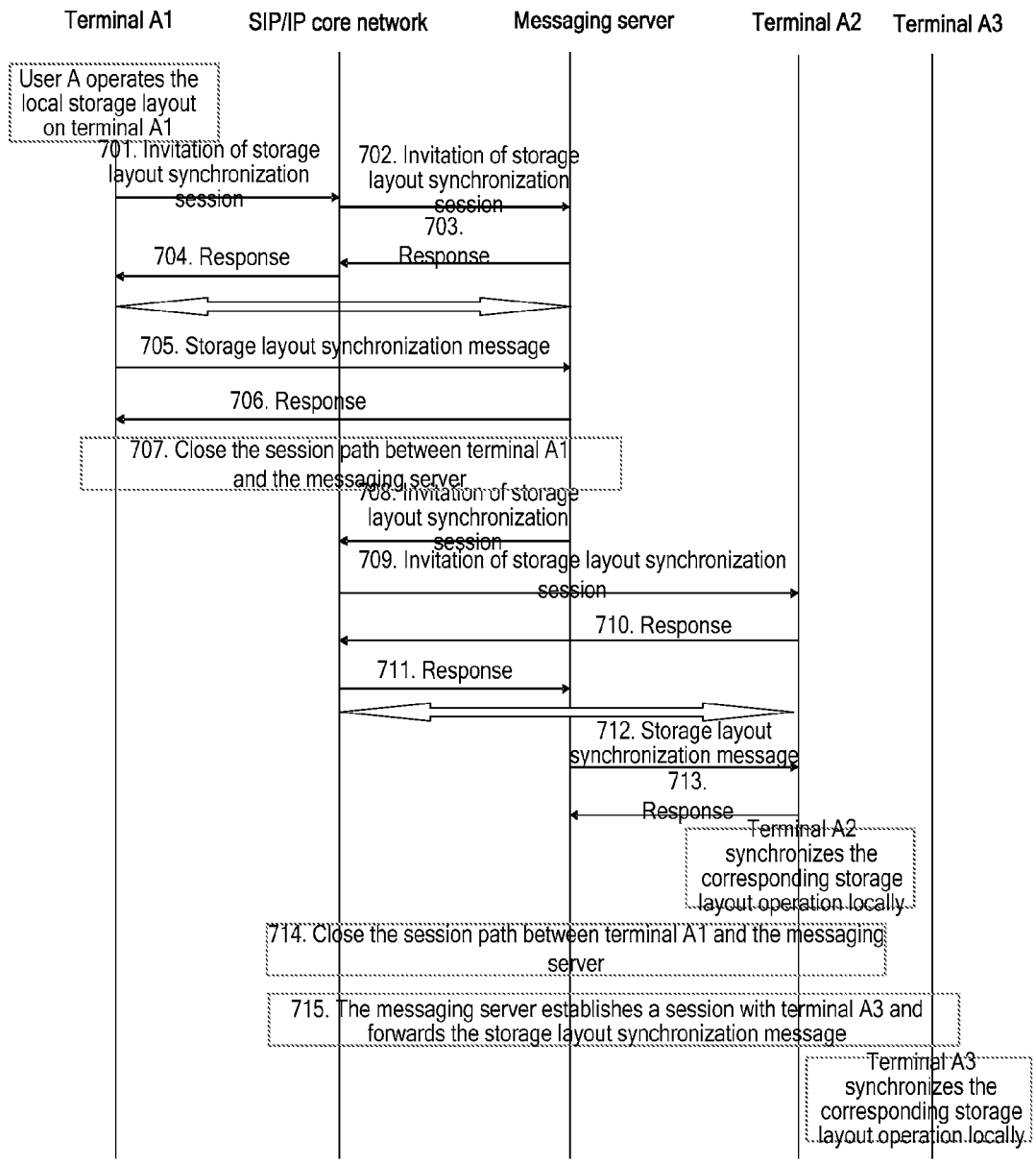
FIG. 7 is a flow chart of another method for synchronizing storage layout between multiple terminals, according to another embodiment of the present invention.

FIG. 7 is a flow chart of another method for synchronizing the storage layout between multiple terminals in an embodiment of the present invention.

When a user A updates the storage layout and/or storage data on terminal A1, terminal A1 sends a storage layout synchronization request to other related terminals (such as A2 and A3) of user A, so that the relevant terminals A2 and A3 synchronously update the storage layout and/or storage data. In this embodiment, the storage layout synchronization request of terminal A1 is realized by establishing a storage layout synchronization session with the messaging server and the relevant terminals (A2 and A3) and using the established session path to send a synchronization message which carries the storage layout and/or storage data.

As shown in FIG. 7, when user A performs storage layout operation on terminal A1, the process of processing the synchronization storage layout operation is as follows:

Blocks 701-704: User A operates the storage layout and/or updates the storage data on terminal A1, which includes: creating, renaming, and deleting the storage directory, operating (storing, updating, and deleting) the storage data items in the storage directory, or the operating (copying and moving) the storage data items between storage directories. In order to synchronize the corresponding storage layout operation between other terminals of user A, terminal A1 sends an invitation of storage layout synchronization session to the messaging server where A1 is registered. The messaging server returns a response to terminal A1, thus, establishing a storage layout synchronization session between the messaging server and A1.

Blocks 705-707: Terminal A1 uses the established session path, such as MSRP transmission path, to send a storage layout synchronization message to the messaging server and set the Content-Type header field "message/hierarchy-synchronization" and the Content-Disposition header field to "synchronization," which instructs the message receiver to perform the storage layout synchronization operation, according to the received message body. In the practical implementation, the storage layout synchronization description in the XML format may be given: <synchronization> "id" and type "type," including: storage layout directory or storage data item path <folder-hierarchy> and the corresponding storage directory or storage data item name; synchronization action (such as creating, deleting, and renaming) performed for the storage directory, or synchronization action (such as storing, updating, and deleting) performed for the storage data item, or copying and moving storage data between storage directories.

The storage layout synchronization messages may be sent at a single attempt or at multiple attempts. After sending the storage layout synchronization message to the messaging server, terminal A1 requests to close the session path between terminal A1 and the messaging server in block 707.

Blocks 708-711: The messaging server checks whether other online terminals of user A exist according to the identifier of user A (such as SIP URI). This embodiment supposes that user A owns terminal A2 and A3 which are online. In order to synchronize the storage layout between all terminals of user A, the messaging server sends an invitation of storage layout synchronization session to terminal A2 first, and establishes a storage layout synchronization session with terminal A2.

Blocks 712-714: Through the session path with terminal A2 (such as MSRP transmission path), the messaging server forwards the storage layout synchronization message to A2. After receiving the synchronization message, terminal A2 returns a response to the messaging server and performs the corresponding operation in the local storage device, according to the storage layout information in the synchronization message.

In block 714: The messaging server requests to close the session path between it and A2.

Block 715: Like the case in blocks 712-714, the messaging server forwards the storage layout synchronization message to terminal A3 of user A. After receiving the synchronization message, A3 performs the same action in the local storage device, according to the storage layout synchronization description carried in the message body, and returns a response.

If terminal A2 or A3 is offline when the messaging server receives the storage layout synchronization message, the operation is different from the above block in that: the messaging server saves the synchronization message as an offline message and sends it through a synchronization session after A2 or A3 goes online.

Those skilled in the art understand that: unlike the foregoing processes, the storage layout synchronization message may be sent in those following ways:

I. terminal A1 invites all other online terminals of user A (namely, terminals A2 and A3 in this embodiment) to join the multi-party session under the control of the messaging server, and each terminal negotiates with the messaging server about the synchronization session transmission path; in the multi-part session, terminal A1 sends a storage layout synchronization message to the messaging server; after receiving the storage layout synchronization message, the messaging server forwards the synchronization message to terminals A2 and A3, respectively.

II. Alternatively, terminal A1 establishes a session with terminals A2 and A3, respectively, through a messaging server and sends a storage layout synchronization message through their own session path.

Similarly, if the operation of storing layout and the operation of updating the storage data are performed on A1 concurrently, the process of processing the synchronization message is similar to the foregoing process basically, and is not repeated here any further.

Embodiment 8

Figure 8:
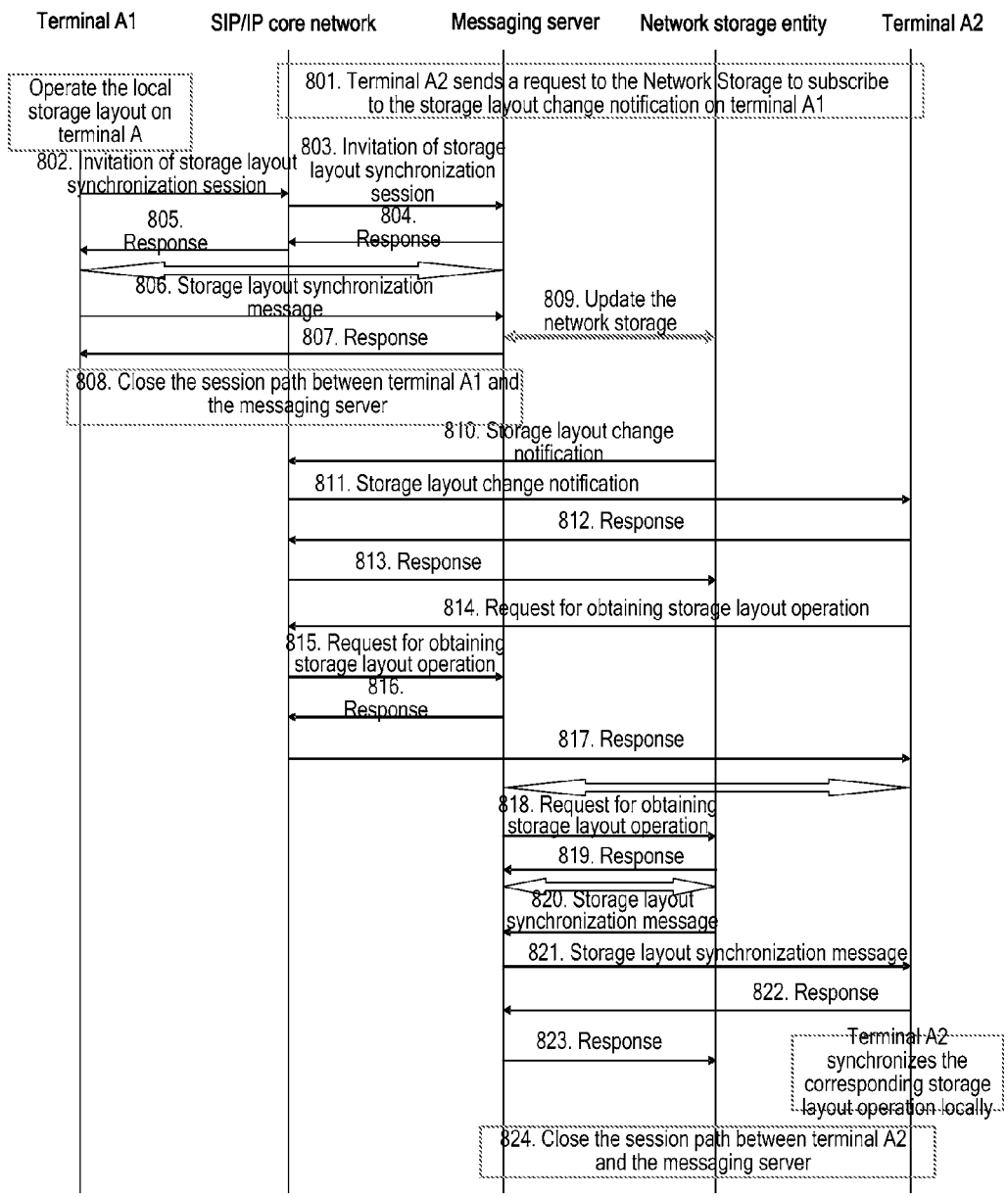
FIG. 8 is a flow chart of one more method for synchronizing storage layout between multiple terminals, according to another embodiment of the present invention.

FIG. 8 is a flow chart of another method for synchronizing storage layouts between multiple terminals. In FIG. 8, terminals A1 and A2 represent the client terminals used by the multi-terminal user A; SIP/IP Core network represents the core network for routing the SIP signaling messages; messaging server represents the messaging service server where user A is registered; Network Storage is a network storage entity deployed in the home network of user A and is responsible for storing the data related to the messaging service of the user. As shown in FIG. 8, the storage layout synchronization subscription notification is processed in the following process:

Block 801: Terminal A2 of user A sends to Network Storage a request for subscribing to the notification of storage layout change on terminal A1 of user A.

Blocks 802-805: User A operates the local storage layout on terminal A1, including: operating (creating, renaming, or deleting) the storage directory, operating (storing, updating, or deleting) storage data items in the storage directory, or operating (copying or moving) the storage data items between storage directories. In order to synchronize the corresponding storage layout operation between terminal A1 and other terminals of user A, terminal A1 sends an invitation of storage layout synchronization session to the messaging server where A1 is registered, and negotiates a synchronization session transmission path with the messaging server. The messaging server returns a response to terminal A1.

Blocks 806-808: Terminal A1 uses the established session path, such as MSRP transmission path, to send a storage layout synchronization message to the messaging server, and set a new Content-Type header field "message/hierarchy-synchronization" and the Content-Disposition header field to "synchronization," which instructs the message receiver to perform the storage layout synchronization operation, according to the received message body. In the practical implementation, the storage layout synchronization description in the XML format may be given: <synchronization> "id" and type "type," including: storage layout directory or storage data item path <folder-hierarchy> and the corresponding storage directory or storage data item name; synchronization action (such as creating, deleting, and renaming) performed for the storage directory, or synchronization action (such as storing, updating, and deleting) performed for the storage data item, or copying and moving storage data between storage directories. After receiving the synchronization message, the messaging server returns a response to terminal A1.

The storage layout synchronization messages may be sent at a single attempt or at multiple attempts. After sending the storage layout synchronization message to the messaging server, terminal A1 requests to close the session path between terminal A1 and the messaging server in block 808.

Block 809: The messaging server stores the storage layout description information in the received storage layout synchronization message, and the possibly existent synchronization messages or media files into the storage space associating user A in the Network Storage.

Blocks 810-813: The Network Storage generates and sends a storage layout change notification on terminal A1 of user A to terminal A2. The storage layout change notification includes a summary of the storage layout which has changed on the local storage of A1, for example, storage layout path, the corresponding storage directory or storage data item name, causes for change of storage layout (such as storing, updating, or deleting), metadata information of the storage data items involved in the storage layout synchronization operation (such as name, size, and format of messages or media files).

Blocks 814-819: According to the received storage layout change notification, terminal A2 sends a storage layout synchronization session invitation to the messaging server, requesting to obtain the actual contents of the storage data items involved in the storage layout synchronization operation; the messaging server invites the storage data item associating the storage layout of terminal A1 in the storage space of user A in the Network Storage to join the synchronization session as a virtual user.

Blocks 820-823: Through the established storage layout synchronization session path, the Network Storage entity sends the storage data item associating the storage layout of terminal A1 to terminal A2 through the messaging server. According to the storage layout and the received storage data items, terminal A2 performs the synchronization on the local terminal.

Moreover, in the practical implementation, the following blocks may apply instead:

Terminal A2 sends a subscription request to the messaging server. After a session is established between the messaging server and terminal A1 and terminal A1 sends a synchronization message to the messaging server, the messaging server sends a notification to terminal A2. According to the notification, terminal A2 sends a request for establishing a session with the messaging server to obtain the synchronization messages.

Alternatively, terminal A2 sends a subscription request to terminal A1. After the storage layout on terminal A1 changes, A1 sends a notification to terminal A2. According to the notification, terminal A2 sends a request for establishing a session with terminal A1 to obtain synchronization messages.

It is apparent from the foregoing solution that the technical solution under the embodiments of the present invention enables synchronization of messages, message states, or storage layout between all terminals of user B based on SIP messages, thus, enriching user experience.

Besides, the IMAP protocol may also be used for synchronizing messages, message states, or storage lay out between multiple terminals. If the IMAP protocol is applied, all the clients and servers of the CPM system must support the IMAP protocol, so that the clients and servers use the extended IMAP protocol to synchronize messages or message states. Two basic implementation methods are described as following: (1) The CPM server saves all messages and the state of each message, and to synchronize messages and message states between multiple terminals over the existing IMAP protocol. The terminal (namely, the first terminal) on which a new message is created or a message state is changed uploads a message update notification or a message state change notification to the server over the IMAP protocol, and the server changes and saves the corresponding message state, or saves the message update notification. Afterwards, the server synchronizes the message update notification or the message state change notification to other clients over the IMAP protocol. In this way, the synchronization between multiple terminals is implemented indirectly over the existing IMAP protocol. (2) If the CPM server does not save the message or the message state, the IMAP protocol needs to be extended, and it is necessary to change the existing operation of receiving message state change notifications in the CPM server over the IMAP protocol. That is to say, when the CPM server receives a message state change notification, even if the CPM server contains no message associating the message state change notification, the CPM server does not send any error information to the terminal which sends the message state change notification. Instead, the CPM server constructs a message of changing the message state or saves the message state change notification to notify them to other terminals of the user, and returns a receiving success message to the originating terminal, for example, the first terminal. In this way, the state update information may be forwarded in the CPM server over the IMAP protocol.

The following embodiments use the IMAP protocol to synchronize the message states between multiple terminals, or synchronize messages between multiple terminals. That is to say, the embodiments may extend the append command of the IMAP, so that the message state change notification which carries the message state and the message identifier is sent to the CPM server through an append command. The CPM server uses a Fetch response to notify other terminals of the user. The terminal whose state is changed may also use other commands, for example, "store," of the IMAP protocol to synchronize message states. With an extended "store" command, the message state change notification which carries the message state or message identifier is sent to the CPM server through a "store" command. After the CPM server receives the "store" command, different policies are applied, depending on whether the message associating the message identifier is saved in the CPM server. If the CPM server stores the message associating the message identifier, the process is implemented normally according to the IMAP protocol, namely, the message state on the CPM server is changed, and a message of changing the message state is sent to other terminals of the user. If the CPM server does not store any message associating the message identifier, only a message of changing the message state is sent to other terminals, and a receiving success message is returned to the terminal which sends the message state change notification.

Besides, the embodiments of the present invention may use the IMAP protocol only for sending a message of changing the message state from the server to other terminals. Whereas, the terminal whose state is changed uses another protocol, for example, SIP and SMTP protocol, to send a message state change notification to the CPM server. After receiving a notification of changing the message state, the CPM server constructs the IMAP protocol and sends the message of changing the message state to other terminals of the user over the IMAP protocol.

However, the IMAP protocol may also be used to synchronize messages between multiple terminals, which is implemented in the same way as the method for synchronizing message states between multiple terminals over the IMAP protocol, and is not detailed here any further.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method for synchronizing between multiple terminals, comprising:
   receiving, by a server, a message state change notification for indicating message state synchronizing requirement from a first terminal, wherein the message state change notification carries an identifier of a message, a message state change description, a user identifier, and an identifier of the first terminal;
   obtaining, by the server, an identifier of a second terminal according to the user identifier;
   determining, by the server, whether the second terminal is online;
   if determining that the second terminal correlated with the first terminal is online, sending, by the server, the message state change notification for indicating message state synchronizing requirement to the second terminal correlated with the first terminal; and
   if determining that the second terminal correlated with the first terminal is offline, storing the message state change notification for indicating message state synchronizing requirement and sending the message state change notification to the second terminal correlated with the first terminal after the second terminal goes online.

2. The method of claim 1, wherein the message state change notification for indicating message state synchronizing requirement is a message update notification carrying update information.

3. The method of claim 1, wherein the message state change notification for indicating message state synchronizing requirement is a storage layout synchronization request carrying at least one of a storage directory and storage data.

4. The method of claim 1, wherein the message state change notification for indicating message state synchronizing requirement is received by the server through at least one of: (a) the APPEND command of the SIP PUBLISH, SIP MESSAGE, MSRP SEND, MSRP REPORT, and IMAP protocol, and (b) a STORE command of the IMAP protocol.

5. The method of claim 1, wherein the message state change notification for indicating message state synchronizing requirement is sent by the server to the second terminal correlated with the first terminal through at least one of SIP NOTIFY, SIP MESSAGE, MSRP SEND, MSRP REPORT, and IMAP FETCH.

6. A server having a processor, comprising:
   a receiving module, adapted to receive a message state change notification for indicating synchronizing requirement from a first terminal, wherein the message state change notification carries an identifier of the message, a message state change description, a user identifier, and an identifier of the first terminal;
   an identifier obtaining module, adapted to obtain an identifier of a second terminal correlated with the first terminal;
   a judging module adapted to judge whether the second terminal is online; wherein if the judging module determines that the second terminal is online, the sending module sends the message state change notification for indicating synchronizing requirement to the second terminal; if the judging module determines that the second terminal is offline, the sending module sends the message state change notification for indicating synchronizing requirement to the second terminal correlated with the first terminal after the second terminal goes online; and
   a sending module, adapted to send the message state change notification for indicating synchronizing requirement to the second terminal correlated with the first terminal.

* * * * *